United States Patent [19]

Smith

[11] Patent Number: 5,193,826
[45] Date of Patent: Mar. 16, 1993

[54] FACE PLATE ADAPTER FOR A MACHINE TOOL

[75] Inventor: Maurice A. Smith, Ledyard, Conn.

[73] Assignee: The United States of America as represented by the Secretary of the Navy, Washington, D.C.

[21] Appl. No.: 903,292

[22] Filed: Jun. 24, 1992

[51] Int. Cl.$^5$ .............................................. B23Q 3/06
[52] U.S. Cl. ..................................... 279/145; 82/165; 269/902
[58] Field of Search .................. 82/165; 279/143-145; 269/902

[56] References Cited
U.S. PATENT DOCUMENTS
4,583,432  4/1986  Bricker ........................ 269/902 X Primary Examiner—Steven C. Bishop
Attorney, Agent, or Firm—Michael J. McGowan; Prithvi C. Lall; Michael F. Oglo

[57] ABSTRACT

A face plate adapter for securing a tubular work piece to a machine tool for rotating said work piece about an axis comprising a face plate, an adjustable mounting assembly for mounting the adapter to a machine tool, an elongated nesting member extending outwardly from the face plate for receiving the work piece in a nesting relation therein such that the work piece extends outwardly from the face plate substantially along the rotation axis, and an adjustable clamping device for securing the work piece in the nesting member.

4 Claims, 1 Drawing Sheet

FACE PLATE ADAPTER FOR A MACHINE TOOL

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a face plate adapter for securing tubular stock in a lathe or other machine tool, so that the inner surface of said stock may be finished or machined.

(2) Description of the Prior Art

Many automatic or manual machine tool procedures are of the type in which the feed or stock material is a tubular metal bar. In machining tubular stock, and particularly the inner surface thereof, it is necessary to secure the tubular stock at both ends in the machining tool. In a typical machining tool such as a lathe, tubular stock is secured at one end by a chuck or other conventional adjustable securing means, and by a tail stock or a machine steady rest, on the opposing end. When the tubular stock is grasped by these standard securing means, considerable clamping pressure is transferred to the tubular stock and distortion of the roundness thereof can occur. The distortion in the roundness of the tubular stock caused by the clamping pressure typically causes out-of-roundness to result on the finished surface after machining thereof. The degree of the distortion caused by the clamping pressure is directly related to the wall thickness of the tube. The thinner the wall thickness of the tube the greater the potential for distortion of the roundness of the tubular stock.

Although there have heretofore been known various devices for holding or steadying feed material or stock in machine tools, none of the prior art references addresses the problem of distortion of tubular stock caused by the grasping of tubular stock by the conventional clamping means heretofore used.

SUMMARY OF THE INVENTION

The present invention overcomes the tubular distortion problems associated with the conventional grasping or clamping means heretofore used by providing a face plate adapter for securing tubular work pieces to a lathe or other machine tool without significant clamping or grasping pressure. Briefly, the face plate adapter comprises a face plate having mounting slots formed therein, wherein a like number of attaching bolts extend therethrough and are received in threaded receiving holes in the machine tool, a pair of elongated walls having interior and exterior surfaces, the walls extending outwardly from the face plate and joined to each other such that the interior surfaces of the walls form an angular nest for receiving a work piece in a tangential nesting relation, and a plurality of circular adjustable band clamps which encircle the angular nesting means and the work piece to securely clamp the latter within the former in nested relation. The adapter also preferably comprises counterweight means for counterbalancing the elongated walls and circular band clamps during rotation of the workpiece.

It is therefore an object of the present invention to provide an adapter which will allow thin wall tubing to be clamped in a machine tool without significant distortions in the roundness of the tubing.

It is a further object of the present invention to provide a durable long-lasting clamping device which will save set-up time and contribute to improved, more accurate machine work.

Still another object is the provision of a clamping device wherein the same device is capable of clamping and holding a range of differently sized tubing.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawing wherein the single

DESCRIPTION OF THE PREFERRED EMBODIMENT

Figure 1:
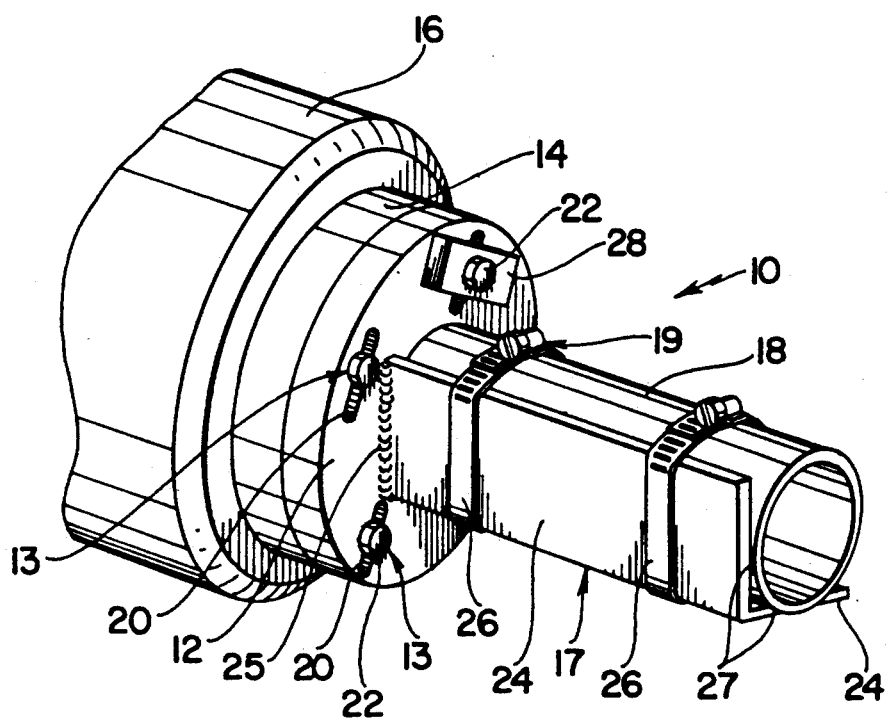
FIG. 1 is a perspective view showing the face plate adapter as embodied in the present invention.

Referring now to the drawing figure, the face plate adapter of the present invention is shown generally at 10. The face plate adapter 10 generally comprises a face plate 12, an adjustable mounting assembly 13 for mounting face plate 12 to a rotating spindle 14 of a machine tool 16, an elongated nesting member 17 for receiving a work piece 18 in a nesting relation, and an adjustable clamping device 19 for securing work piece 18 in the nesting member 17.

A typical lathe or machine tool will have a rotating spindle for rotating the work piece during machining. Adjustable mounting assembly 13 for mounting adapter 10 to rotating spindle 14 of machine tool 16 comprises face plate 12 having a plurality of substantially parallel, elongated mounting slots 20 formed therein, and a like number of elongated attaching bolts 22. Attaching bolts 22 extend through slots 20 and are received in threaded engagement in receiving holes (not shown) located in rotating spindle 14 of machine tool 16. Elongated mounting slots 20 allow face plate adapter 10 to be adjusted up or down to effectively align the rotation axis of work piece 18 being machined with the rotation axis of machine tool 16.

Elongated nesting member 17 comprises a pair of elongated walls 24 having interior and exterior surfaces. The walls 24 are secured to plate 12 by any suitable means, such as by welding 25, and extend outwardly therefrom in substantially parallel relation to the rotation axis of spindle 14. The walls 24 are joined to each other such that the interior surfaces of walls 24 form an angular nest for receiving work piece 18 in a nesting relation. Specifically, the walls 24 tangentially engage work piece 18 at circumferentially spaced lines 27 extending longitudinally for substantially the entire length of the work piece.

Work piece 18 is secured within nesting member 17 by a pair of circular adjustable band clamps 26 which encircle the walls 24 of the nesting member 17 and the nested work piece 18 to securely clamp the work piece in its operative position.

The tangential contact lines between walls 24 and work piece 18, in combination with the band clamps 26, function to firmly and securely grip and hold the work piece in its operative position. Also, different diameter tubes can effectively be secured within nesting member 17, although appropriate adjustment of face plate 12 would have to be made when a different diameter tube is mounted to insure proper axial alignment of the tube with the rotational axis of spindle 14.

The preferred embodiment of the adapter further preferably comprises counterweight means for counterbalancing the nesting member 17 and clamping device 19 during rotation of the work piece 18 to minimize vibrations that may take place. The counterweight means comprises a weighted plate 28 having a mounting hole (not shown) formed therein for receiving one of the attaching bolts 22 therethrough, whereby counterweight 28 is mounted on face plate 12 as is clearly shown in the drawing. More than one such counterweight may be used, if desired.

The nesting member has two basic functions. It is a first function of the nesting member to hold the work piece in such a position that the work piece may rotate around the same axis as that of the spindle of the machine tool. The second function of the nesting member is to provide an elongated load bearing surface such that the work piece nests within the nesting member and makes contact there within over an elongated load bearing area such that minimal clamping pressure is needed to hold the work piece firmly in place whereby distortion of the tubular work piece is minimized or eliminated entirely. The present invention effectively accomplishes both of these functions.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A face plate adapter for securing a tubular work piece to a machine tool for rotating said work piece about an axis comprising:
   a face plate;
   means for adjustably mounting said face plate to said machine tool for rotation therewith, said means including a plurality of substantially parallel, elongated mounting slots formed in said face plate and securing means extending through said slots for adjustably securing said face plate to said machine tool;
   elongated nesting means extending outwardly from said face plate for receiving said work piece in a nesting relation therein so that said work piece extends outwardly from said face plate substantially along said axis; and
   adjustable clamping means for securing said work piece in said nested relation in said nesting means.

2. The adapter of claim 1, wherein said machine tool includes a rotating spindle having a plurality of threaded receiving holes, said securing means comprising a plurality of elongated attaching bolts extending through said mounting slots and received in threaded engagement in said receiving holes.

3. The adapter of claim 1, wherein said machine tool further comprises counterweight means mounted on said face plate for counterbalancing said nesting means and said clamping means during rotation of said work piece about said axis.

4. The adapter of claim 1, wherein said adjustable clamping means comprises at least one circular, adjustable band clamp encircling said nesting means and said work piece, and clamping said work piece in said nested relation.

* * * * *